(12) United States Patent
Maeshima et al.

(10) Patent No.: US 8,614,818 B2
(45) Date of Patent: Dec. 24, 2013

(54) IMAGE PROCESSING APPARATUS

(75) Inventors: Toshiyuki Maeshima, Kiyosu (JP);
Daiki Nishioka, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 317 days.

(21) Appl. No.: 13/093,177

(22) Filed: Apr. 25, 2011

(65) Prior Publication Data

US 2011/0267658 A1 Nov. 3, 2011

(30) Foreign Application Priority Data

Apr. 28, 2010 (JP) ................................. 2010-104177

(51) Int. Cl.
*G06F 3/12* (2006.01)
*G06K 15/00* (2006.01)

(52) U.S. Cl.
USPC .......................... 358/1.15; 358/1.13; 358/2.1

(58) Field of Classification Search
USPC ......... 358/1.15, 1.9, 2.1, 1.13, 403, 404, 463, 358/468, 486; 399/387
See application file for complete search history.

(56) References Cited

U.S. PATENT DOCUMENTS 5,438,426 A * 8/1995 Miake et al. .................. 358/403
7,193,745 B2 * 3/2007 Oomori .......................... 358/1.9

FOREIGN PATENT DOCUMENTS

| JP | 1993-91277 | 4/1993 |
| JP | 1993-244376 | 9/1993 |
| JP | 1995-192109 | 7/1995 |

* cited by examiner

*Primary Examiner* — Charlotte M Baker
(74) *Attorney, Agent, or Firm* — Finnegan, Henderson, Farabow, Garrett & Dunner, L.L.P.

(57) ABSTRACT

The present invention realizes an image processing apparatus including: a reading section to obtain image data by scanning a document, a document feeding section to deliver a plurality of pages of documents successively to the reading section, a detection section to detect a document group from the plurality of documents successively delivered by the document feeding section, a memory section to memorize the image data obtained by the reading section, an output section to output the image data, having been memorized by the memory section, in accordance with an output condition having been set, and a control section that is configured, in a case in which a plurality of document groups has been detected by the detection section, so as to receive an output condition for the image data, which has been memorized by the memory section, on the basis of a document group.

15 Claims, 12 Drawing Sheets

IMAGE PROCESSING APPARATUS

This application is based on Japanese Patent Application No. 2010-104177 filed on Apr. 28, 2010 with the Japanese Patent Office, the entire content of which is hereby incorporated by reference.

TECHNICAL FIELD

The present invention relates to an image processing apparatuses for processing image data obtained by scanning a document, more particularly, to an image processing apparatus which outputs the image data according to set output conditions.

BACKGROUND OF THE INVENTION

In the field of image processing apparatuses for processing image data obtained by scanning a document, various techniques for reducing complexity of work and operation for scanning a document have been devised.

For example, Japanese Patent Application No. 1995-192109 discloses techniques in which plural pages (sheets) of documents, consisting of a plurality of document groups, are placed on an automatic document feeder and fed into a scanner successively in such a manner that each document group is set in a portrait or landscape orientation by changing the orientation alternately for each document group, or only the first page of each document group is set in a portrait orientation. Then, the separation of each document group is recognized by detecting the orientation of the image data, obtained by scanning the documents, and the image data of each document group is registered into a memory device in accordance with each document group, thus, plural document groups can be continually registered via batch registration.

For example, Japanese Patent Application No. 1993-244376 discloses a technique such that, in a case in which plural pages of documents are read and transmission is carried out to a plurality of destinations with different contents of transmission (pages to be transmitted), different pages can be transmitted in accordance with the destination via a single reading operation by making it possible to designate pages, to be transmitted, for each destination.

For example, Japanese Patent Application No. 1993-91277 discloses techniques such that plural documents are read separately and registered into plural files separately so that it is possible to designate a combination of files in accordance with the destination. In this manner, it is possible to transmit different combination of files, which have been read and registered, in accordance with the destination so that it is possible to omit operations to re-read documents which have already been read.

When documents are to be scanned and the read images (image data) are to be outputted, there is a case that a user desires to read plural document groups (one or plural pages of documents belonging to the same group) and to output the image data under different output conditions for each document group. For example, there is a case that a user desires to change the number of copies to be outputted in accordance with the document group in case of a copying operation, and in case of facsimile transmission, a user desires to change transmission destination in accordance with the document group.

In the above-described cases, because it has conventionally been difficult to output image data with different conditions in accordance with the document group by placing plural document groups onto an automatic document feeder and reading the documents successively one at a time, reading operations are carried out in accordance with each document group (namely, in accordance with each output condition). For example, a series of work and operations, such as work to set one document group onto an automatic document feeder, operations to set output conditions for the document group and to initiate reading operations, and work to remove the documents from the feeder, are carried out for each document group multiple times repeatedly, so that the work and operations become cumbersome. Also, when plural pages of documents are read via an automatic document feeder and if a plurality of document groups is detected among the plural documents, for example, it becomes inconvenient because it is difficult to set output conditions in accordance with each document group.

On the other hand, Japanese Patent Application No. 1995-192109 discloses techniques in which it is possible to register image data, which have been obtained by reading a plurality of document groups successively, in accordance with each document group. However, setting of output conditions, in accordance with each document group, cannot be carried out in cases in which a plurality of document groups is detected while document reading is being carried out. Thus, it can not respond to the desire. Japanese Patent Application No. 1993-244376 discloses techniques in which one document group, consisting of plural pages, is read and transmission of image data of different combination of the pages can be carried out to plural destinations. However, it becomes inconvenient when plural document groups are detected while document reading is being carried out because setting of output conditions, in accordance with each document group, cannot be carried out. Japanese Patent Application No. 1993-91277 discloses techniques in which plural document groups are read separately and registered as different files so as to transmit different combination of files to plural destinations. However, again, because setting of output conditions on the basis of a document group cannot be carried out, it becomes inconvenient when plural document groups are detected while document reading is being carried out.

SUMMARY OF THE INVENTION

The present invention has been made in consideration of the above problems, and it is one of the main objects to provide an image processing apparatus capable of improving convenience by simplifying work and operations for cases in which image data, which have been obtained by reading plural document groups, is to be outputted with different output conditions for each document group.

Accordingly, at least one of the objects of the present invention can be attained by any one of the image processing apparatuses described as follows.

[1] An image processing apparatus reflecting one aspect of the present invention may include, but is not limited to: a reading section to obtain image data by scanning a document; a document feeding section to deliver a plurality of pages of documents successively to the reading section; a detection section to detect a document group from the plurality of documents successively delivered by the document feeding section; a memory section to memorize the image data obtained by the reading section; an output section to output the image data, which has been memorized by the memory section, in accordance with an output condition having been set; and a control section that is configured, in a case in which a plurality of document groups has been detected by the detection section, so as to receive an output condition for the image data, which has been memorized by the memory section, on the basis of a document group.

[2] The image processing apparatus of [1] reflecting another aspect of the present invention further includes a display section and an operation section, wherein the control section is configured, in a case in which a plurality of document groups is detected by the detection section, so as to: (a) display a setting screen on the display section for setting an output condition, on the basis of a document group, for the image data which have been memorized by the memory section; and (b) receive a setting of an output condition on the basis of a document group via the operation section.

[3] The image processing apparatus of [1], reflecting still another aspect of the present invention, wherein the output section includes an image forming section that forms and outputs an image based on image data onto a recording medium, and the output condition includes a number of copies to be outputted by the image forming section.

[4] The image processing apparatus of [1], reflecting still another aspect of the present invention, wherein the output section includes an image transmission section that transmits image data to an external device, and the output condition includes a transmission destination of the image data to be transmitted from the image transmission section.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

Below, preferred embodiments of the present invention will now be described with reference to the accompanying drawings, without the present invention being limited to the embodiments.

First Embodiment

Figure 1:
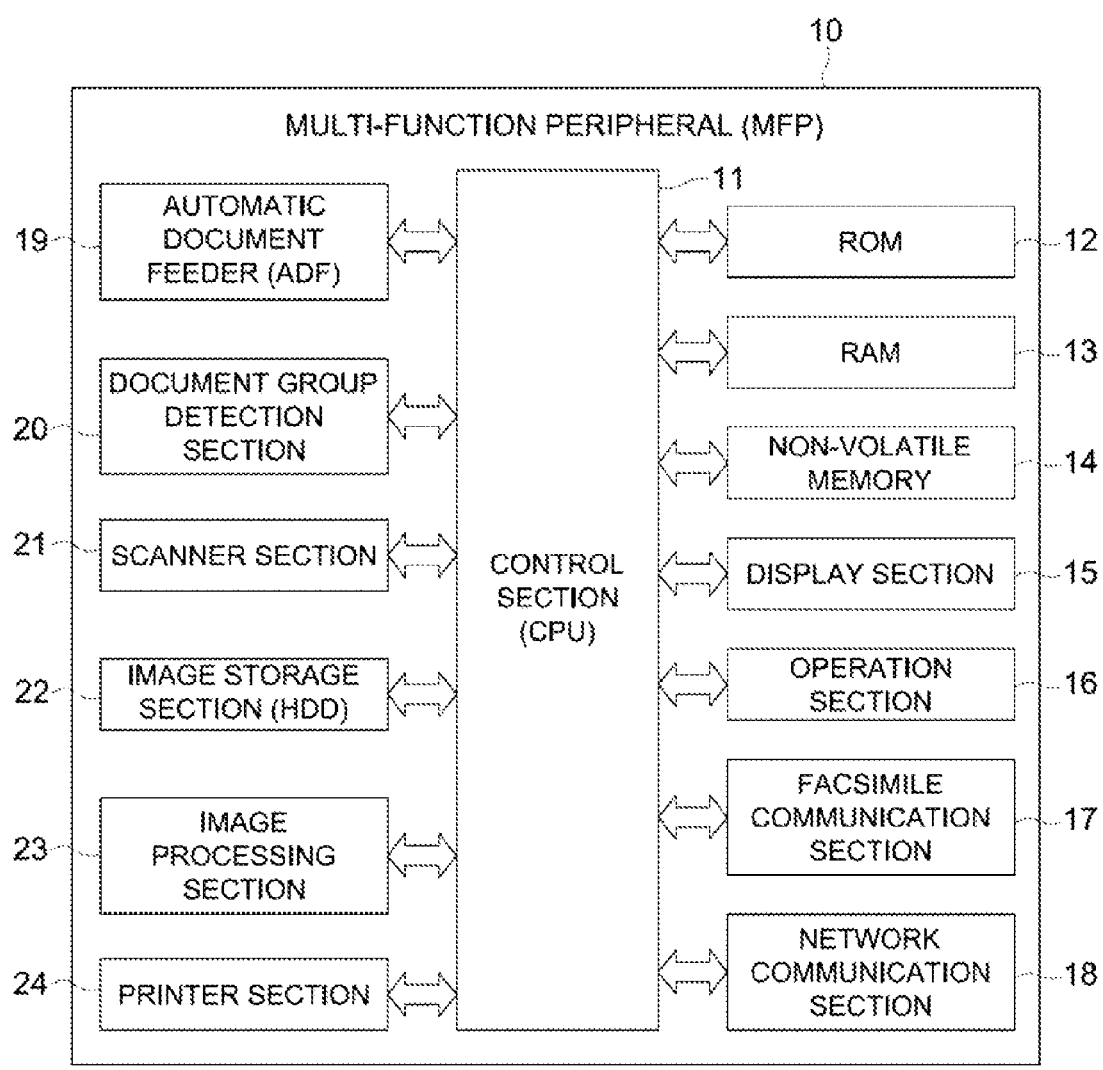
FIG. 1 is a block diagram schematically showing an example of a multi-function peripheral as an image processing apparatus according to a first embodiment of the present invention.

FIG. 1 is a block diagram schematically showing an example of multi-function peripheral 10 (hereinafter referred to as MFP 10) as an image processing apparatus according to a first embodiment of the present invention.

MFP 10 is provided with functions such as a) copying function of optically reading a document and printing the duplicated image on a recording medium, b) scanning function of storing the image data of a document that has been read in the form of a file, or transmitting the image data of a document that has been read out to an external terminal, such as another MFP 10 and USB (universal serial bus) memory, or the like, c) printing function of printing and outputting the image data (file) on a recording medium, based on the image data stored in MFP 10 and the image data received from an external terminal, d) facsimile function of transmitting and receiving image data, and e) electronic mail function of transmitting and receiving an electronic mail, and the like.

Also, MFP 10 is provided with a scanner section, which obtains image data by scanning a document, and an automatic document feeder (ADF), which delivers plural pages of documents, to be read, to the scanner section one by one. In cases of a copy operation, a facsimile transmission operation, and the like, MFP 10 outputs image data (the read image of documents), which have been obtained by the scanner section, in accordance with the output conditions which have been set by the user.

MFP 10 is also provided with a document group detection section which detects document group from plural pages of documents which have been delivered successively via the automatic document feeder. The term "document group" refers to a group (set) of document which includes one page (sheet) of a document or plural pages (sheets) of documents, and is recognized based on predetermined identification information or delimiter information. In cases in which a plurality document groups, such as groups A, B, C, - - - , for example, which are stacked one on top of another, are placed onto the automatic document feeder of MFP 10, the document group detection section detects the document groups while the plural pages of documents, including the document groups (groups A, B, C, - - - ), are delivered one by one via the automatic document feeder. When plural document groups are detected, MFP 10 manages the image data, which have been obtained by scanning documents via the scanner section, in accordance with the document group.

Further, MFP 10 is provided with functions of displaying a setting screen (document group type output setting screen), when a plurality document groups is detected, to set output conditions in accordance with each document group, and of receiving the setting of output conditions in accordance with each document group. Based on the output conditions set for each document group, MFP 10 outputs the image data, which MFP 10 manages in accordance with each document group.

MFP 10 is configured by connecting ROM (read only memory) 12, RAM (random access memory) 13, nonvolatile memory 14, display section 15, operation section 16, facsimile communication section 17, network communication section 18, automatic document feeder (ADF) 19, document group detection section 20, scanner section 21, image storage section 22, image processing section 23, and printer section 24, to CPU (central processing unit) 11, as a control section that comprehensively controls the operations of MFP 10.

CPU 11 controls operations of MFP 10 based on the program stored in ROM 12. In ROM 12, various programs and various fixed data, which are executed by CPU 11, are memorized (stored). RAM 13 is used as a work memory, which temporarily stores various data when the CPU 11 executes a program. Further, RAM 13 is used as an image memory for temporarily storing the image data. Non-volatile memory 14 is a rewritable memory whose stored contents are retained even when power to the memory has been switched off. Non-volatile memory 14 memorizes apparatus-specific information and various setting information of MFP 10.

Display section 15 consists of a liquid crystal display (LCD) or the like, and displays various screens such as initial screens, operation screens, setting screens, and the like. Operation section 16 consists of a touch panel that is provided on top of the surface of the liquid crystal display and that detects the coordinate positions which have been depressed, and various types of buttons such as a start button, a stop button, a numerical keypad, and other buttons. Operation panel 16 carries out the function of receiving various operations that a user performs on MFP 10.

Facsimile communication section 17 communicates via public switched telephone network with an external apparatus that is provided with a facsimile function. Network communication section 18 communicates with an external terminal, a server, or other devices, via a network, such as LAN (Local Area Network), and the like.

Automatic document feeder 19 delivers documents, set on the feeder, to a reading position of scanner section 21. Automatic document feeder, for example, but is not limited to, includes a document tray onto which documents are set, a conveyance path to guide the documents, having been set on the document tray, to the reading position of scanner section 21 and to eject, a plurality of conveyance rollers to feed the documents, set on the document tray, one by one into the conveyance path and to eject the documents from the conveyance path after passing the documents through the reading section of scanner section 21, and an ejection tray onto which the documents, which have been read via scanner section 21, are ejected.

Document group detection section 20 detects document group from plural pages of documents which has been delivered one by one successively via automatic document feeder 19. More specifically, document group detection section 20 detects document groups, which are included in a plurality of sheets of documents, by recognizing a delimiter between the groups. Document group detection section 20 may adopt a known configuration to detect document group.

For example, the user may insert a dummy recording medium (recording medium for delimiting groups), which indicates a delimiter, between document groups, and set the documents (a plurality of pages of documents to be read) onto automatic document feeder 19. Document group detection section 20 may be configured so as to identify the dummy recording medium which was delivered via automatic document feeder 19 and distinguish the separation (delimitation) of document groups while reading the documents, and detect that the document groups before and after the dummy recording medium are of different document groups.

Also, an image information (image information for delimiting groups), which indicates a delimiter, may be printed on the first page or the last page of the document of a document group. Document group detection section 20 may be configured so as to identify the above mentioned image information from documents which have been delivered via automatic document feeder 19 and read by scanner section 21, and distinguish the separation (delimitation) of document groups, and detect the plurality document groups.

More particularly, in cases in which the image information is printed on the first page document of a document group, if the image information is not included in the image data of preceding document A and the image information is included in the image data of subsequent document B, MFP 10 may recognize that these documents A and B are the delimitation of document groups, and may detect that documents up to document A and document B onwards as being of different document groups. In cases in which the image information is printed on the last page document of a document group, if the image information is included in the image data of preceding document A and the image information is not included in the image data of subsequent document B, MFP 10 may recognize that these documents A and B are the delimitation of document groups, and may detect that documents up to document A and documents after document B as being of different document groups.

As a replacement for the above-mentioned image information, the image of the first page document or the last page document may be printed on a recording medium into which a non-contact ID tag (REID (radio frequency identification) tag) has been embedded. Document group detection section 20 may be configured to recognize the delimiter of document groups by distinguishing the non-contact ID tag via a non-contact ID tag reader, or the like, and thereby detect a plurality of document groups. Also, that recording medium, into which a non-contact ID tag has been embedded, may be used as the above-mentioned dummy recording medium.

Also, in cases in which the above-mentioned dummy recording medium, image information for delimiting groups, non-contact ID tag, or the like, is not used, document group detection section 20 may be configured to recognize the delimiter of document groups via changes in the orientation of a preceding document and a subsequent document (the orientation of document setting onto automatic document feeder), or in the size of a preceding document and a subsequent document, and detect document groups in such a manner that documents prior to the changed document (in orientation or in size) and documents onwards are of difference document groups.

Scanner section 21 reads the images of the documents optically and obtains the image data Scanner section 21 consists of, for example, but is not limited to, a) a light source to irradiate a document with light, b) a line image sensor to read the document line by line in the width direction by receiving light reflected from the document, c) a shifting device to shift the reading position in units of a line in the length direction of the document line by line, d) an optical path composed of a lens and mirrors in order to lead the reflected light from the document to the line image sensor and to form an image of the document, e) a converting section to convert analog picture signals outputted from the line image sensor into digital image data, and the like.

Image storage section 22 consists of a hard disc device (hard disc drive: HDD), and has the functions of storing not only various types of memorized data, but various types of image data which were inputted as well. Image processing section 23 has the functions of carrying out various types of image processing on the image data, such as image correction, rotation, enlargement/reduction, compression/decompression, and other image processing.

Printer section 24 forms an image on a recording medium based on image data via an electro-photographic process. Printer section 24 is configured as, for example, but is not limited to, a so-called laser printer which consists of a conveyance device to convey recording media, a photoconductive drum, a charging device, an LD (laser diode) which is controlled to be turned on and off in accordance with the inputted image data, a scanning unit to scan the laser light radiated from the LD onto the photoconductive drum, a developing device, a transfer separating device, a cleaning device, and a fixing device. Another method of the printer such as an LED (light emitting diode) printer, in which LEDs radiate a photoconductive drum instead of the laser light, or other method of printers, may be used.

The control operations of MFP 10 will now be described.

Figure 2:
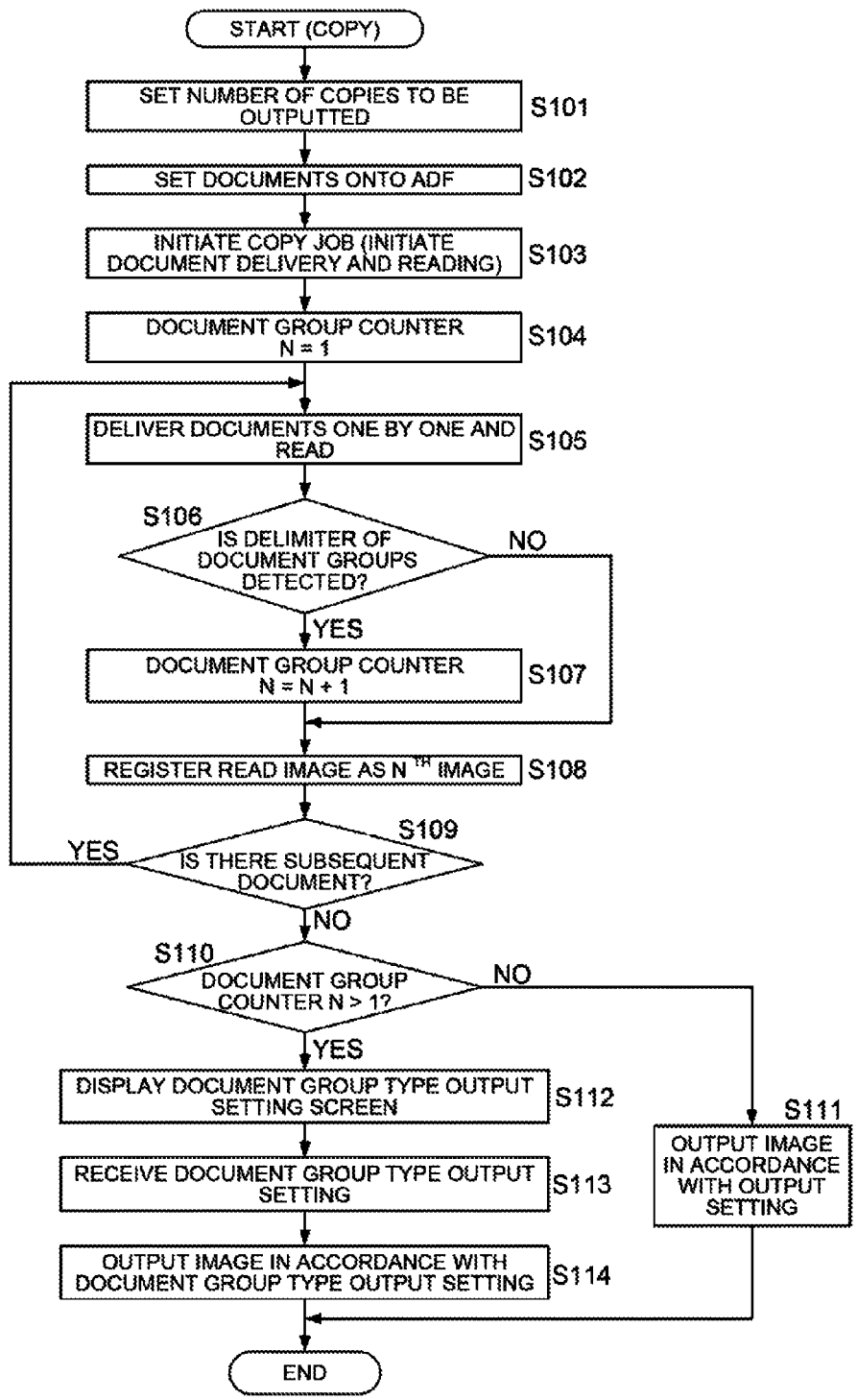
FIG. 2 is a flow chart showing an example of a copy operation of an image processing apparatus according to the first embodiment of the present invention.
Figure 3:
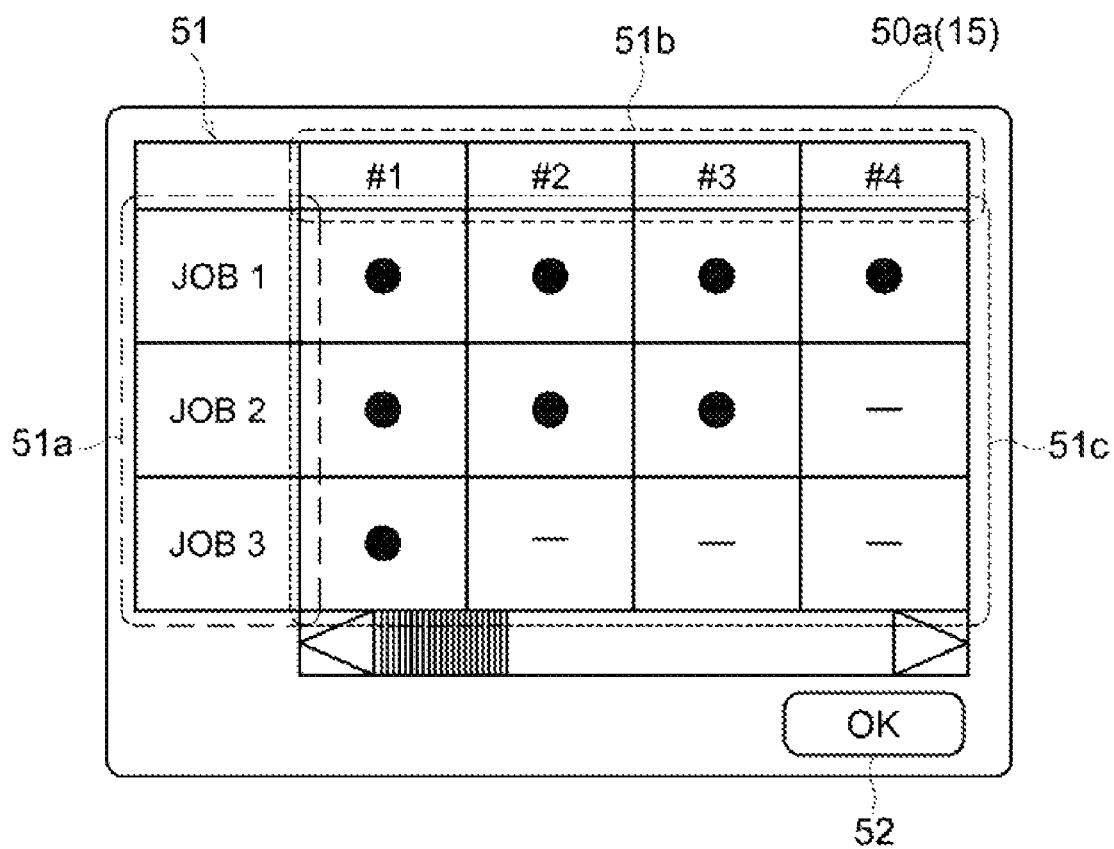
FIG. 3 is a diagram showing an example of a document group type output setting screen according to the first embodiment of the present invention.
Figure 4:
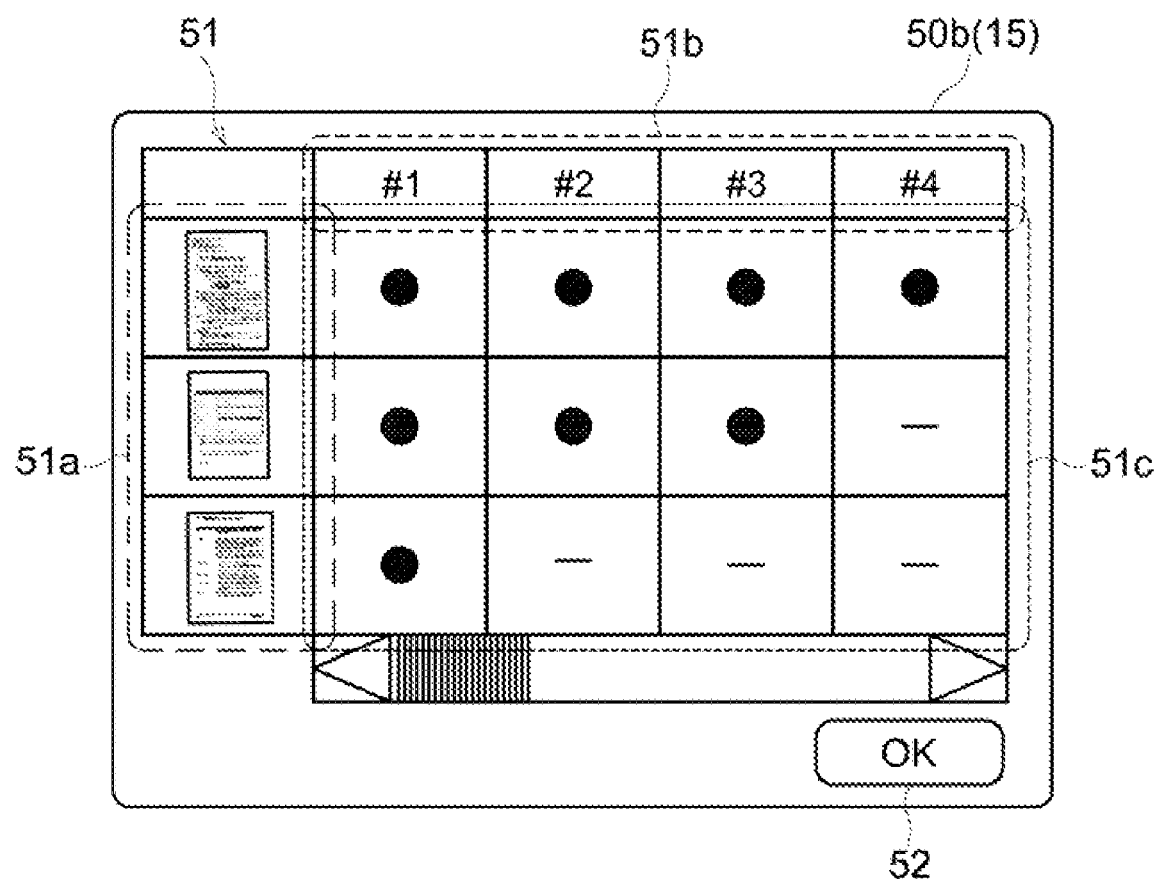
FIG. 4 is a diagram showing an example of a variation of document group type output setting screen according to the first embodiment of the present invention.

Here, explanations are given using the example of copy operation. FIG. 2 is a flow chart showing an example of the copy operation of MFP 10. FIGS. 3 and 4 are diagrams showing examples of the document group type output setting screen (50*a*, 50*b*). The document group type output setting screen is a screen to receive settings of output conditions for each document group which has been previously described. Here, an example is explained in which the output condition, to be received for each document group, is the number of copies to be outputted.

Note that, in this operation, the detection of a plurality of document groups via document group detection section 20 is carried out by recognizing the delimiter of a preceding document group (namely, by recognizing the last page document of the preceding document group) by the first page document of the subsequent document group. For example, recognition of the delimiter of a preceding document group is made by printing the above-described image information for delimiting groups on the first page document of a document group, or printing the first page document of a document group on a recording medium into which a non-contact ID tag has been embedded. Also, the quantity ("number") of document groups, detected by document group detection section 20, is configured to be counted by a document group counter. The image data, which has been obtained via scanner 21 by reading the documents, is managed on the basis of a document group by registering the image data in connection with the "number" of document group.

When a document is copied by MFP 10, the user sets output conditions for copying more specifically, the user sets various types of setting items (parameters) for copying via a copy setting screen (touch panel) displayed on display section 15 of MFP 10. Here, the user sets the number of copies to be outputted, as appropriate. In case the user skips the setting of the number of copies to be outputted, then an initial setting value (for example, one set) is set.

When CPU 11 of MFP 10 receives a setting of output conditions for copying (the number of copies to be outputted, and the Lie), CPU 11 stores the setting information in RAM 13 (step S101). When documents are set onto automatic document feeder (ADF) 19 by the user (step S102), and the start button is depressed, CPU 11 initiates the copying job (step S103).

CPU 11 sets the initial value of the document group counter to 1 (N=1) (step S104). CPU 11 controls automatic document feeder 19 to deliver the documents to scanner section 21 one by one, and controls scanner section 21 to read the documents which have been delivered (step S105). CPU 11 temporarily stores the image data, obtained via scanner section 21 by reading the documents, in RAM 13.

In a case in which a delimiter of document groups is not detected via document group detection section 20 while delivering the documents via automatic document feeder 19 (step S106: NO), CPU 11 reads the count value in the document group counter, and links the number, indicated by the count value (initially "1"), with the image data which has been stored in RAM 13, and registers the image data as the image data of the number (job number) (step S108).

In cases in which a delimiter of document groups is detected via document group detection section 20 (step S106: YES), CPU 11 increments the count value in the document group counter by adding 1 to the count value (N=N+1), and updates the document group counter (step S107). After the update, CPU 11 reads the counter value in the document group counter, and links the number, indicated by the count value, with the image data which have been stored in RAM 13, and registers the image data as the image data of the number (job number) (step S108).

In cases in which there is a subsequent document, which has not yet been read, on automatic document feeder 19 (step S109: YES), the flow returns to step S105, and repeats the subsequent steps in a similar fashion. In cases in which there is no subsequent document (step S109: NO), this means that the reading of all the documents, set onto automatic document feeder 19, has been completed.

Here, CPU confirms the count value in the document group counter. If the count value in the document group counter is 1 (in the case that the number of document group is 1) (step S110: NO), CPU 11 controls printer section 24 to output the image data based on the image data, which have been stored in RAM 13, in accordance with the setting information (setting information via copy setting screen) of various types of setting items (output conditions) which have been memorized in RAM 13 (step S111/End).

In this case, MFP 10 controls to print copies (duplicates) of one document group, which have been read, in accordance with the number of copies which has been set via the copy setting screen.

If the count value in the document group counter is more than 1 (in the case that the number of document group is plural numbers) (step S110: YES), CPU 11 controls to display the document group type output setting screen on display section 15 (step S112). The user may set output conditions (in this example, the output conditions are the number of copies to be outputted) for each document group via the document group type output setting screen (touch panel).

When CPU 11 receives a setting of output conditions for each document group via the document group type output setting screen (step S113), CPU 11 memorizes the setting information in RAM 13, and erases the output setting screen on the basis of a document group. Then, CPU 11 controls printer section 24 to print the image data based on the image data which have been stored in RAM 13 in accordance with the setting information (setting information via the copy setting screen) of various types of setting items for copy (excluding the number of copies to be outputted), which have been stored in RAM 13, and the setting information (setting information via the output setting screen on the basis of a document group) of the number of copies to be outputted (step S114/END).

In this case, MFP 10 controls to print copies (duplicates) of a plurality of document groups, which have been read, in accordance with the number which has been set via the document group type output setting screen.

In the above-mentioned step S112, document group type output setting screen 50a, as shown in FIG. 3, is displayed. In document group type output setting screen 50a, table 51, OK button 52 which receives the completion of a setting of output conditions (the number of copies to be outputted) for each document group, and the like, are displayed.

Table 51 is a table in a matrix form consisting of row elements of document group (JOB N) and column elements of output destination (# N) and provided with index fields of both rows and columns. In other words, table 51 is a list of the combination of document groups and output destinations. In index field 51a of a row element, [JOB N] (N=1, 2, 3, - - - ), which is the job number representing the numbers of plural document groups, having been detected, are displayed. In index field 51b of a column element, [# N] (N=1, 2, 3, - - - ), which is the output destination, is displayed. In table field 51c, the setting information of output conditions (output conditions for each combination of document group and output destination) is displayed.

In RAM 13, the numbers of plural document groups, being linked with the stored image data, are memorized. The job numbers, which are displayed in index field 51a of a row element, are displayed by using the numbers of document groups which have been memorized in RAM 13.

The quantity (number) of output destinations, shown in index field 51b of a column element, indicates the number of copies to be outputted which has been set prior to the initiation of copying operation. The setting information, having been set via the copy setting screen prior to the initiation of copying operation, of various types of setting items for copy (including the number of copies to be outputted) are memorized in RAM 13, and the quantity (number) of output destinations, shown in index field 51b of a column element, is displayed by using the number of copies to be outputted which is included in the setting information.

Note that, in cases in which duplicates of a document are distributed to a plurality of targets (persons, organizations, and the like), individual output destination may indicate the target of distribution (distribution target type identification information). For example, in cases in which user names, organization names, and the like, are preliminary registered in MFP 10, those user names, organization names, and the like, may be displayed in index field 51b of a column element by carrying out a predetermined operation.

In this example, the setting information of output conditions, shown in table field 51c, is the setting information representing the indicative of existence or non-existence of output (namely, existence or non-existence of print). In this example, [●] (output enabled), which indicates existence of output, and [–] (output disabled), which indicates non-existence of output, are displayed. Those settings of existence or non-existence of output are carried out by depressing individual display area in table field 51c. For example, but is not limited to, when a display area in table field 51c is depressed, the indication of [●] or [–] shown in the display area is switched, and the setting (existence or non-existence of output) is switched according to the indication.

As an example, but is not limited to, when the number of copies to be outputted is set to 4 via the copy setting screen prior to the initiation of copying operation, and 3 document groups are detected while a plurality of pages of documents, set onto automatic document feeder 19, have been automatically delivered, MFP 10 is configured to display table 51 shown in FIG. 3. In this case, MFP 10 displays table 51 of 3 rows×4 columns indicating 3 jobs (JOB 1 to JOB 3), corresponding to the 3 document groups, in index field 51a of row elements, and 4 output destinations (#1 to #4) corresponding to 4 copies, which is the number of copiers to be outputted, in index field 51b of column elements.

In table 51, [●] is initially indicated in all the individual display areas in table field 51c. In this case, it is set to output 4 copies each in 3 jobs (JOB 1 to JOB 3) (a total 12 copies). The user, for example, may switch the setting of output, in the combination of job and output destination shown in table field 51c, from "output enabled" ([●]) to "output disabled" ([–]), by depressing his/her desired display areas in table filed 51c.

In this example shown in FIG. 3, [#4] of [JOB 2] and [#2] to [#4] of [JOB 3] are set as "output disabled". Namely, it is set that 4 copies are outputted in [JOB 1], 3 copies are outputted in [JOB 2], and 1 copy is outputted in [JOB 3]. In other words, it is set that 1 copy each of [JOB 1], [JOB 2], and [JOB 3] is outputted (all of [JOB 1] to [JOB 3] are outputted) in [#1], 1 copy each of [JOB 1] and [JOB 2] is outputted in [#2] and [#3], and 1 copy of [JOB 1] is outputted in [#4].

When OK button 52, shown in document group type output setting screen 50a, is depressed, the output setting, shown in table 51, is completed.

MFP 10, in cases in which a plurality of document groups have been detected in the copy operation explained in FIG. 2, generates a table (a document group type output setting table) which has a similar configuration of table 51, for example, and memorizes the setting information of output conditions, having been set for each document group, in that table. More specifically, CPU 11 on MFP 10, for example, when reading of documents via scanner section 21 is completed, generates a table, which has a similar configuration of table 51, in RAM 13, and memorizing the output conditions (the number of copies to be outputted) set for each document group, by storing the setting information, which have been set via document group type output setting screen 50a, in that table.

In cases in which copies (duplicates) of a plurality of document groups are printed out according to the number of copies to be outputted set for on the basis of a document group, MFP 10 controls to print out the number of copies each for each document group in accordance with the setting information memorized by using the above-mentioned table, or the like.

FIG. 4 is a diagram showing an example of a variation of document group type output setting screen. Like document group type output setting screen 50a shown in FIG. 3, in a configuration in which a plurality of document groups, having been detected, is shown by job numbers, a user may have a difficulty in understanding which document group the job number indicates. Therefore, in document group type output setting screen 50b shown in FIG. 4, a preview image of read document, instead of the job number, is shown in index field 51a of a row element in table 51. With the preview image, the user identifies the document group more readily.

Note that the document group (JOB N) may be shown as an element of a column, and, the output destination (# N) may be shown as an element of a row in table 51 shown in document group type output setting screens 50a and 50b.

As described, MFP 10, according to this embodiment, displays document group type output setting screen 50a (or document group type output setting screen 50b) in cases in which a document group has been detected from plural pages of documents which have been delivered one by one successively via automatic document feeder 19, and receives a setting of output conditions (the number of copies to be outputted) for each document group. In such a way, in cases in which a user desires to output the read image (image data) of documents in accordance with different output conditions for each document group by reading a plurality of document groups, the user may output the read image in accordance with different output conditions for each document group by setting a plurality of document groups onto automatic document feeder 19 and reading the documents successively one at a time.

Therefore, it becomes unnecessary to repeat work and operations, such as setting one document group onto automatic document feeder 19, setting output conditions, and carrying out document reading, for each document group several times. Thus, the work and operations become easier for the cases, in which a user desires to output the read image in accordance with different output conditions for each document group by reading a plurality of document groups. Also, because a plurality of document groups are automatically detected and the document group type output setting screen is automatically displayed according to the automatic detection, an operation to display the document group type output setting screen becomes unnecessary, resulting in a more convenient operations.

Further, convenience is improved because the output conditions can be set for each combination of a plurality of document groups (JOBs) and a plurality of output destinations in the document group type output setting screens shown in FIGS. 3 and 4.

Specifically, in the document group type output setting screens, according to this embodiment, each combination (list of combination) of a plurality of document groups and a plurality of output destinations can be displayed with an improved visualization and in an easy-to-understand manner, by displaying table 51 in a matrix form wherein either one of the document group or the output destination is set as an element of a row, and the other is set as an element of a column. The user can obviously comprehend each combination of a plurality of document groups and a plurality of output destinations with table 51. Also, because a user can designate combination of document groups and output destinations, which are targets to set output conditions, by a selection operation (an intuitive operation) on table field 51*c* (matrix element) in table 51, the designation operation becomes easier.

In such a way, a user can easily find a combination of document group and output destination, which are targets to set output conditions, from the complicated combinations of a plurality of document groups and a plurality output destinations, and can easily designate the combination. In other words, a complicated setting, in which output conditions are different for each combination in the case of combinations of a plurality of document groups and a plurality of output destinations, can be easily carried out.

Further, by displaying the combination of a plurality of document groups and a plurality of output destinations as a list, the setting operation becomes easier when compared to a setting operation in which a setting screen is displayed by document group type, output destination type, and the like, and the setting is carried out by transition of screens.

Second Embodiment

In a second embodiment, a case will be described in which MFP 10 receives a setting of application functions in the output conditions in the copy operation of MFP 10 explained in the first embodiment.

Figure 5:
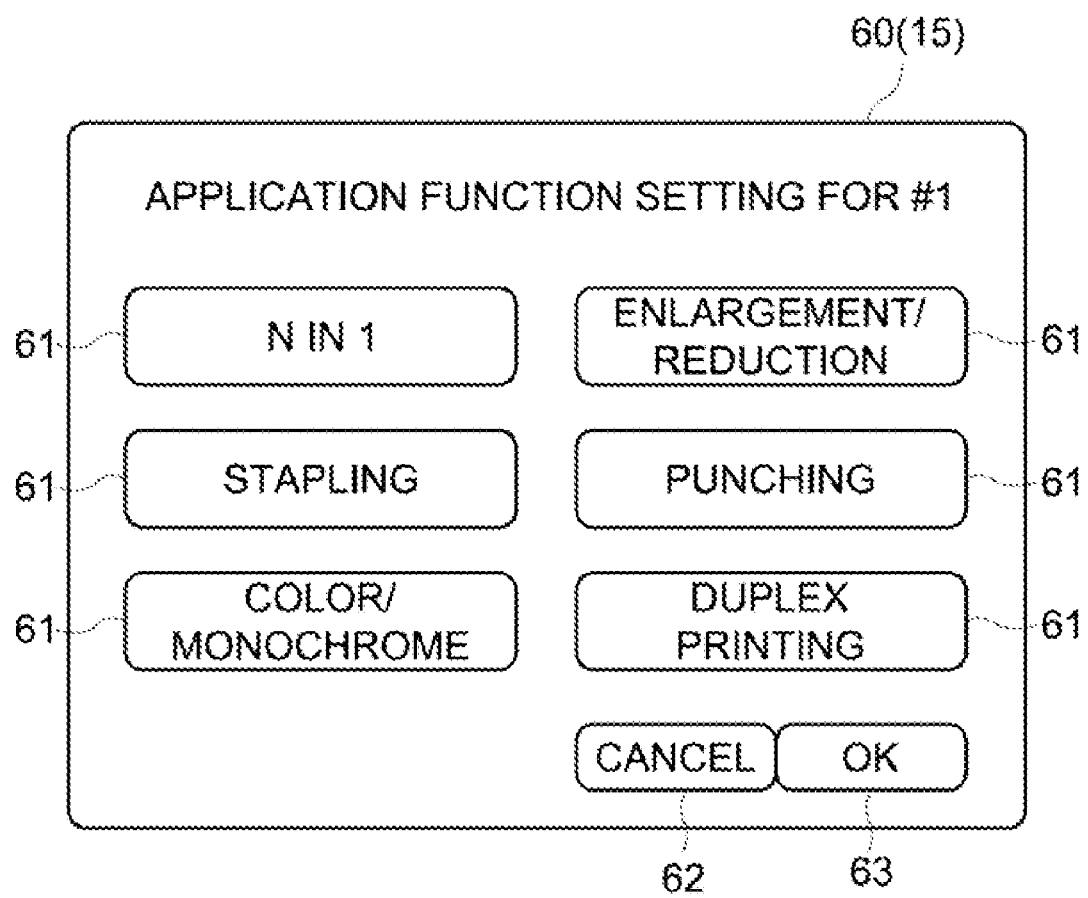
FIG. 5 is a diagram showing an example of an application function setting screen according to a second embodiment of the present invention.

FIG. 5 is a diagram showing an example of application function setting screen 60 according to this second embodiment of the present invention. Here, a case is indicated in which application function setting screen 60 in this example is displayed on display section 15 after the document group type output setting screen (50*a* or 50*b*), explained in the first embodiment, is displayed. This application function setting screen 60 is displayed when index field 51*b* ([# N]) for output destination, in table 51 in the document group type output setting screen (50*a* or 50*b*), is depressed. FIG. 5 shows an example when [#1], in index field 51*b* for output destination in table 51, is depressed.

In application function setting screen 60, application function setting button 61 to receive a setting of application functions, cancel button 62 to receive a cancellation of a setting OK button 63 to receive a completion of setting, and the like, are displayed. In cases in which there are plural kinds of application functions, a plurality of application function setting buttons 61, in accordance with the plural kinds of application functions, are displayed. N in 1 (lay out several pages (N pages) onto one sheet), enlargement/reduction, stapling, punching, color/monochrome, duplex printing, and the like, are examples of application functions.

In this embodiment, it is possible to carry out a setting of application functions on the basis of an output destination by, a) in the document group type output setting screen (50*a*, 50*b*) in table 51, for each output designation, designating a document group ([●]: output enabled), of which read image (image data) is to be outputted to that output destination, b) selecting the area in index field 51*b* where desired output destination, to which a setting of application functions is to be carried out, is indicated, and depressing the area to display application function setting screen 60 for application function setting. In other words, by designating a plurality of document groups to one output destination, and carrying out a setting of application functions by displaying application function setting screen 60 for the output destination, it is possible to set the same application functions (common application functions) to the designated plurality of document groups. In such a way, in cases in which the same application function/functions is/are to be set for a plurality of document groups which corresponds to the same output destination, the operation becomes easier in comparison with a complicated operation in which the same application function/functions is/are set separately for each individual document group.

Note that, although the constitution, in which a setting of application functions is received on the basis of an output destination, has been described in this embodiment, it is also possible to employ the constitution in which a setting of application functions is received on the basis of a document group. This constitution can be realized by a constitution in which, when index field 51*a* ([JOB N]) in table 51 in the document group type output setting screen (50*a*, 50*b*), explained in the first embodiment, is depressed, for example, then the application function setting screen (60) is displayed on display section 15.

Third Embodiment

In a third embodiment, a variation of the document group type output setting screen, explained in the first embodiment, will be described. This third embodiment is a constitution in which an output destination is added via the document group type output setting screen.

Figure 6:
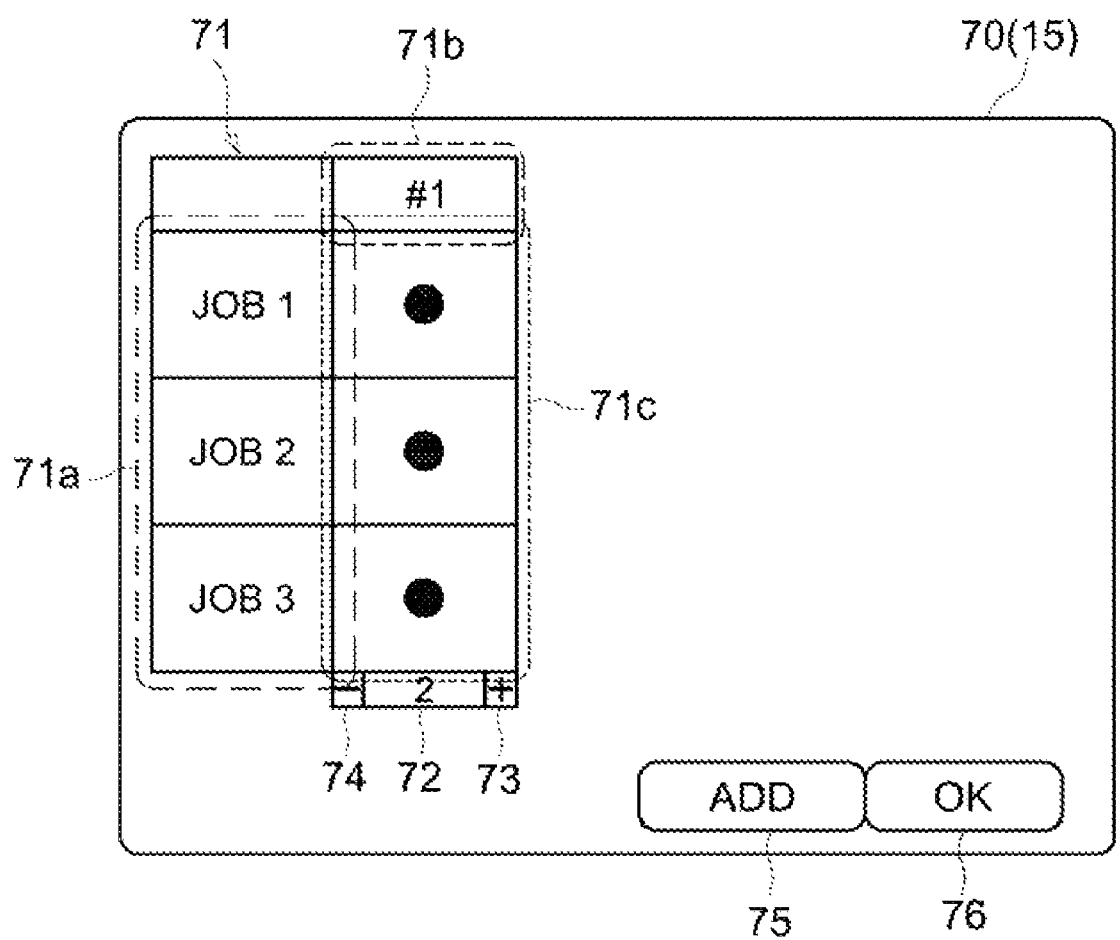
FIG. 6 is a diagram showing an example of a document group type output setting screen according to a third embodiment of the present invention.
Figure 7:
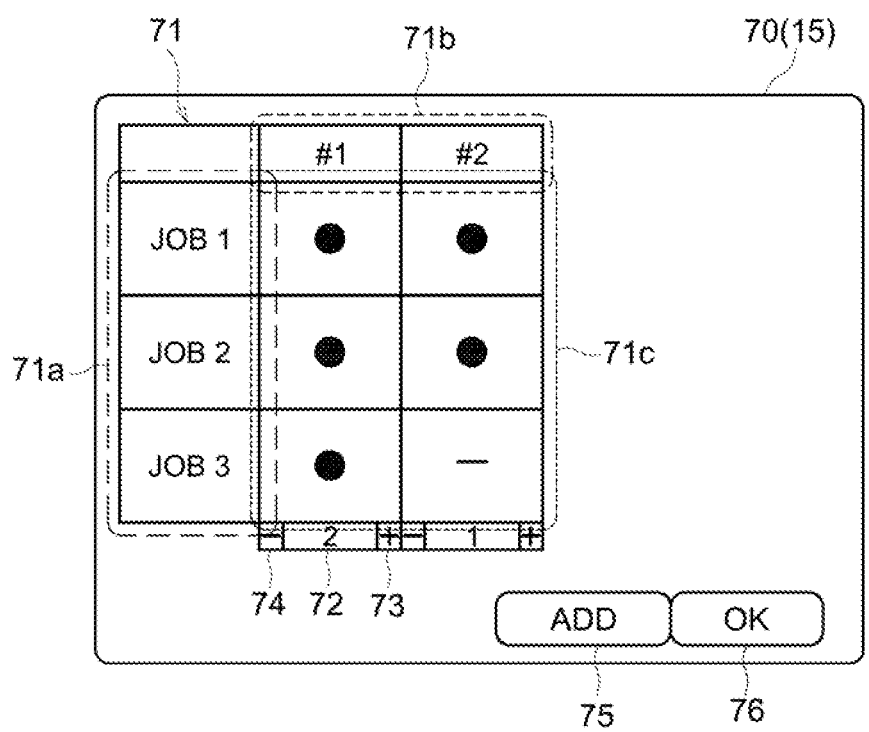
FIG. 7 is a diagram showing an example of a document group type output setting screen according to the third embodiment of the present invention.

FIGS. 6 and 7 each is a diagram showing an example of document group type output setting screen 70 according to the third embodiment of the present invention. Like the copy operation of MFP 10, explained in the first embodiment, document group type output setting screen 70 is also displayed on display section 15 at step S112 in FIG. 2.

In document group type output setting screen 70, table 71 in a matrix form wherein document group (JOB N) is set as a row element and output destination (# N) is set as a column element, and index field (71*a*, 71*b*) of both elements is provided, output number display field 72, plus button 73 ([+]) to receive an increase of the number copies to be outputted, minus button 74 ([−]) to receive a decrease of the number of copies to be outputted, ADD button 75 to receive an addition of output designation, and OK button 76 to receive a completion of a setting of output conditions (the number of copies to be outputted) for each document group, and the like, are displayed.

In index field 71a of a row element of table 71, [JOB N] (N=1, 2, 3, - - - ), which is the job number representing the numbers of plural document groups, having been detected, is displayed. In index field 51b of a column element, [#1], which indicates the first output destination, is displayed. In table field 71c, the setting information indicating existence or non-existence of output (namely, print), which is setting information of output conditions, is displayed (all areas are [●] in initial display).

Output number display field 72, plus button 73, and minus button 74 are displayed adjacently below the lowest row in table filed 71c in the column of output destination [#1]. As the number of copies to be outputted, shown in output number display field 72, the number of copies to be outputted, which has been set by the user via the copy setting screen prior to the initiation of copy, is displayed. This number of copies to be outputted is displayed as the common number for each document group (each JOB) displayed in index field 71a of a row element in table 71.

The user may increase the number of copies, of each document group, to be outputted by depressing plus button 73, and may decrease the number of copies, of each document group, to be outputted by depressing minus button 74. Also, the user may add an output destination by depressing ADD button 75.

In cases in which ADD button 75 is depressed in document group type output setting screen 70 exemplified in FIG. 6, output destination [#2] is added to table 71 as shown in FIG. 7. In each table field of 71c of column of output destination [#2], the setting information representing the indicative of existence or non-existence of output (namely, print), which is a setting information of output conditions, is displayed (all area are [●] in initial display). Output number display field 72, plus button 73, and minus button 74 are displayed adjacently below the lowest row in table filed 71c in the column of output destination [#2]. In this output number display field 72, [1], which indicates that the number of copies to be outputted is 1, is initially displayed.

The user may increase the number of copies, of each document group to be outputted, the number which is common for output destination [#2] by depressing plus button 73 in the column of output destination [#2], and may decrease the number of copies, of each document group to be outputted, the number which is common for output destination [#2] by depressing minus button 74 in the column of output destination [#2]. Also, the user may add output destinations ([#3], [#4], - - - ) by depressing ADD button 75.

Also, similar to the first embodiment, by depressing an individual area of table field 71c, for example, the user is able to switch the display of [●]/[−] shown in this table 71c, and consequently, to switch the setting (existence or non-existence of output) corresponding to the display.

With document group type output setting screen 70, according to this embodiment, in cases in which a plurality of document groups is copied at a time, even after the user sets output conditions (the number of copies to be outputted, and the like), via the copy setting screen, and initiates the copy operation, the user is able to easily add output destination and change the number of copies to be outputted on a output destination by output destination basis.

Fourth Embodiment

In a fourth embodiment, the copy operation of MFP 10 explained in the first embodiment and an variation of document group type output setting screen will be described. In the fourth embodiment, when two document groups are detected while documents are conveyed (namely, while documents are read), a document group type output setting screen for the two document groups (JOB) is displayed, and then, each time a new document group is detected, the new document group is additionally displayed on the document group type output setting screen.

Figure 8:
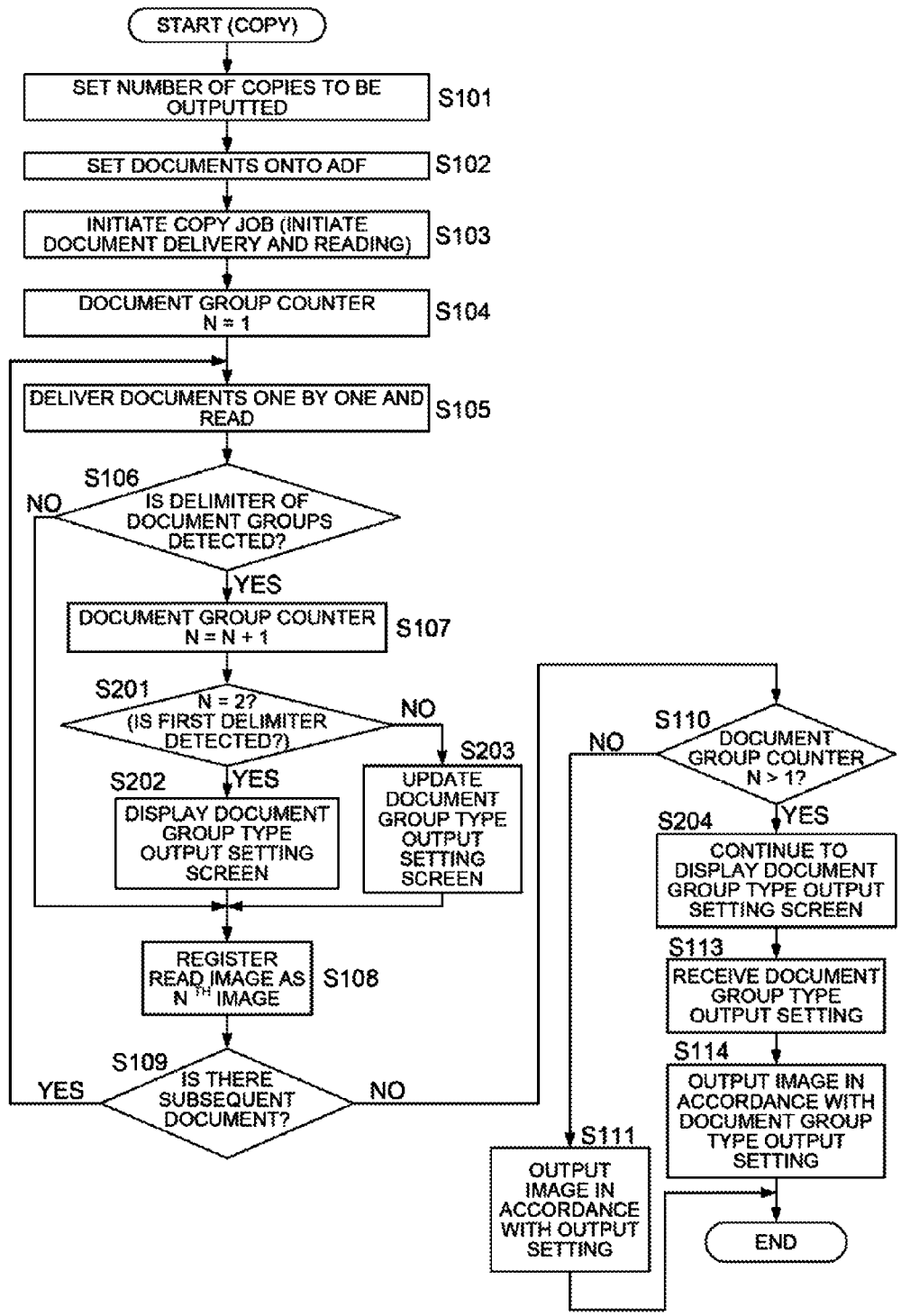
FIG. 8 is a flow chart showing an example of a copy operation of an image processing apparatus according to a fourth embodiment of the present invention.
Figure 9:
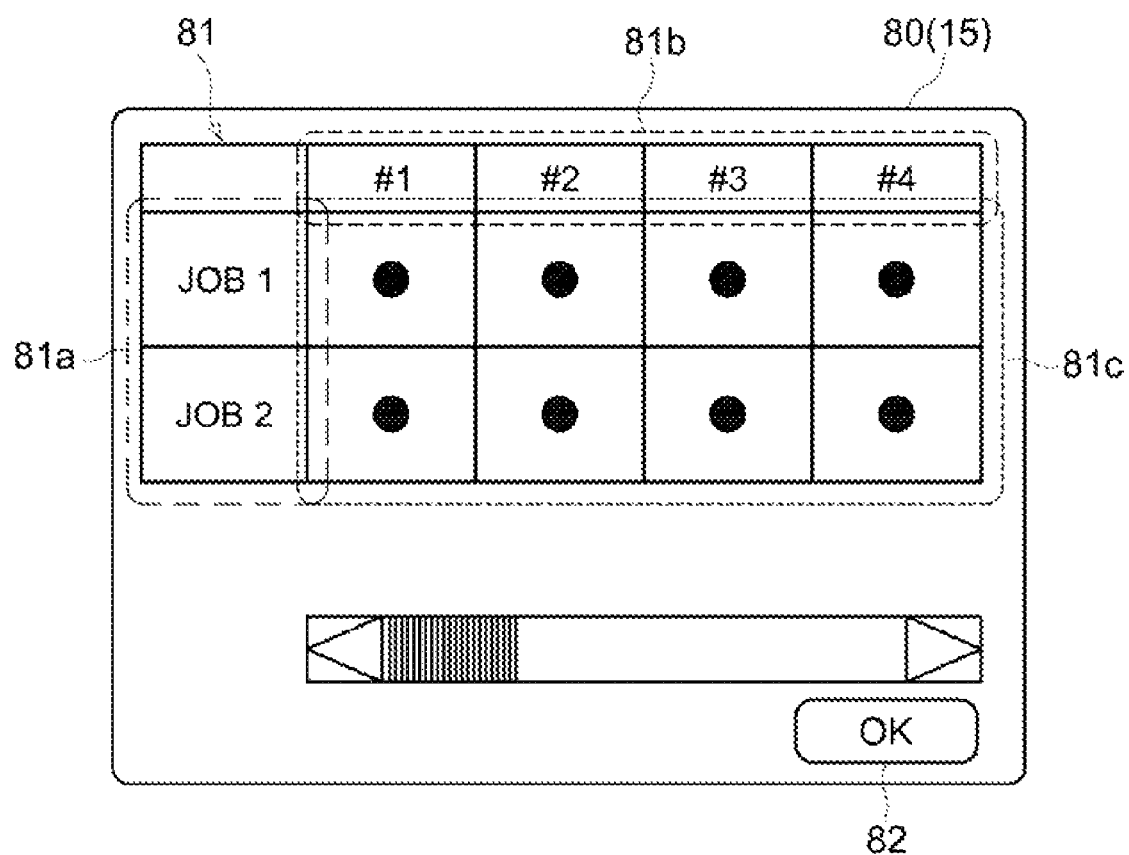
FIG. 9 is a diagram showing an example of a document group type output setting screen according to the fourth embodiment of the present invention.
Figure 10:
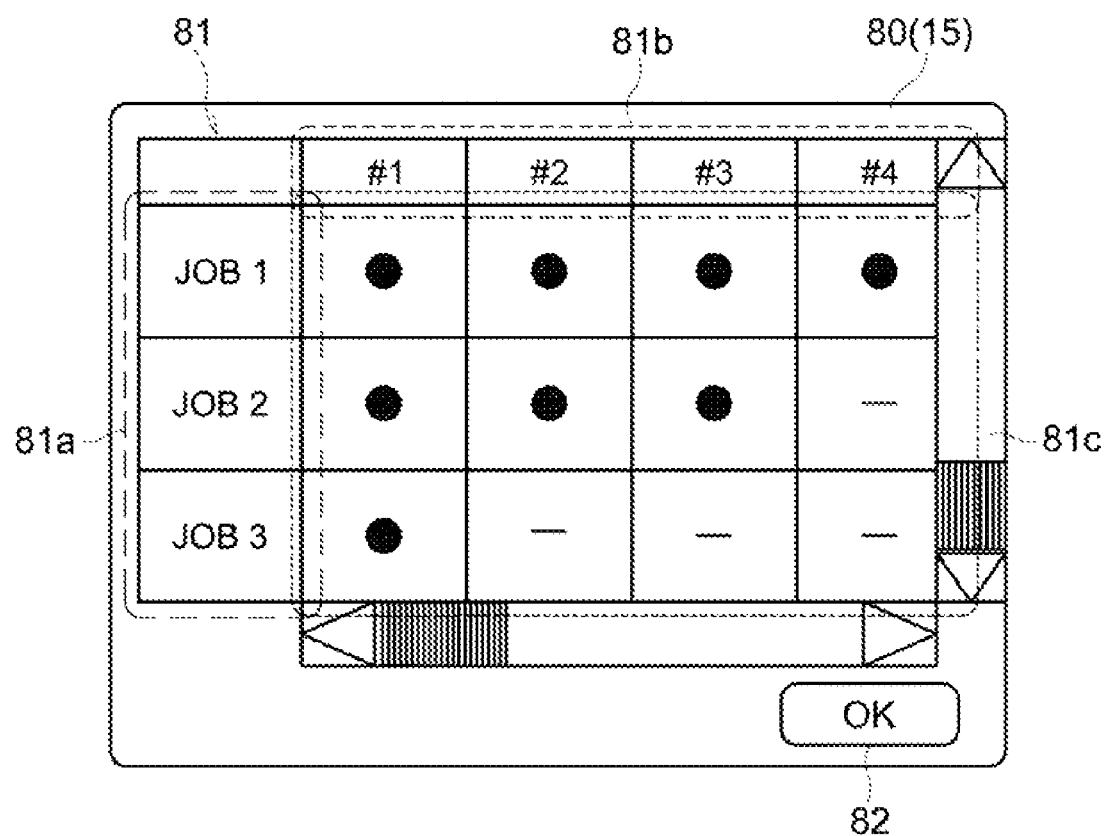
FIG. 10 is a diagram showing an example of a document group type output setting screen according to the fourth embodiment of the present invention.

FIG. 8 is a flow chart showing an example of the copy operation of MFP 10 according to the fourth embodiment. FIGS. 9 and 10 each is a diagram showing an example of document group type output setting screen 80 displayed on display section 15 in this operation.

In FIG. 8, for the steps which are of the same content of steps in FIG. 2 described in the first embodiment, the same step numbers are given, and explanations for the step are omitted.

In FIG. 8, when steps from S101 to S107 are carried out, CPU 11 checks the count value of the document group counter, and in a case that the count value is 2 (in the case of 2 document groups) (step S201: YES), CPU 11 controls display section 15 to display the document group type output setting screen (step S202).

Here, table 81 in a matrix form is displayed in document group type output setting screen 80 as shown in FIG. 9. In index field 81a of a row element of table 81, [JOB 1] and [JOB 2] which represent the job numbers of the detected two document groups are displayed, and, in index field 81b of a column element of table 81, [# N] (N=1, 2, 3, - - - ) are displayed. In table field 81c, the setting information of output conditions ([●] (output enabled)/[−] (output disabled)) for each combination of document group and output destination are displayed. At this point, the user is able to set output conditions (the number of copies to be outputted) individually for the two document groups shown in table 81 of document group type output setting screen 80.

After step S202, in FIG. 8, was carried out, steps after step S108 are carried out.

Also, if the count value is not 2 (namely, the number of document groups is equal to or more than 3) (step S201: NO), CPU 11 updates the document group type output setting screen displayed on display section 15 (step S203).

Here, as shown in FIG. 10, the row of [JOB] (in this example, it is [JOB 3]), which indicates the job number of newly detected document group, is added to table 81 in document group type output setting screen 80. In this case, the user is also able to set output conditions (the number of copies to be outputted) individually for the plural document groups (more than or equal to 3 groups) displayed in table 81 in document group type output setting screen 80.

After step S203, in FIG. 8, was carried out, the steps after step S108 are carried out.

At step S110, if the count value of the document group counter is more than 1 (namely, the number of document group is a plural number) (step S110: YES), CPU 11 continues to display the document group type output setting screen displayed on display section 15 (step S204), and carries out steps S113 onwards.

In such a way, in this embodiment, when MFP 10 detects two document groups while a plurality of pages of documents are delivered in the copy operation, MFP 10 displays document group type output setting screen 80 for the two document groups (JOB). More specifically, MFP 10 additionally displays the two document groups (JOB) in table 81 in document group type output setting screen 80. Further, each time MFP 10 detects a new document group, MFP 10 additionally displays the new document group (JOB) in table 81 in document group type output setting screen 80. In such a way, when two document groups were detected while a plurality of documents are delivered (namely, while documents are read), the user is able to set output conditions (the number of copies to be outputted) individually for the two document groups, and each time when a new document group was additionally detected, the user is also able to set output conditions for the newly detected document group individually.

Fifth Embodiment

In a fifth embodiment, a facsimile transmission operation via MFP 10 will be described.

Figure 11:
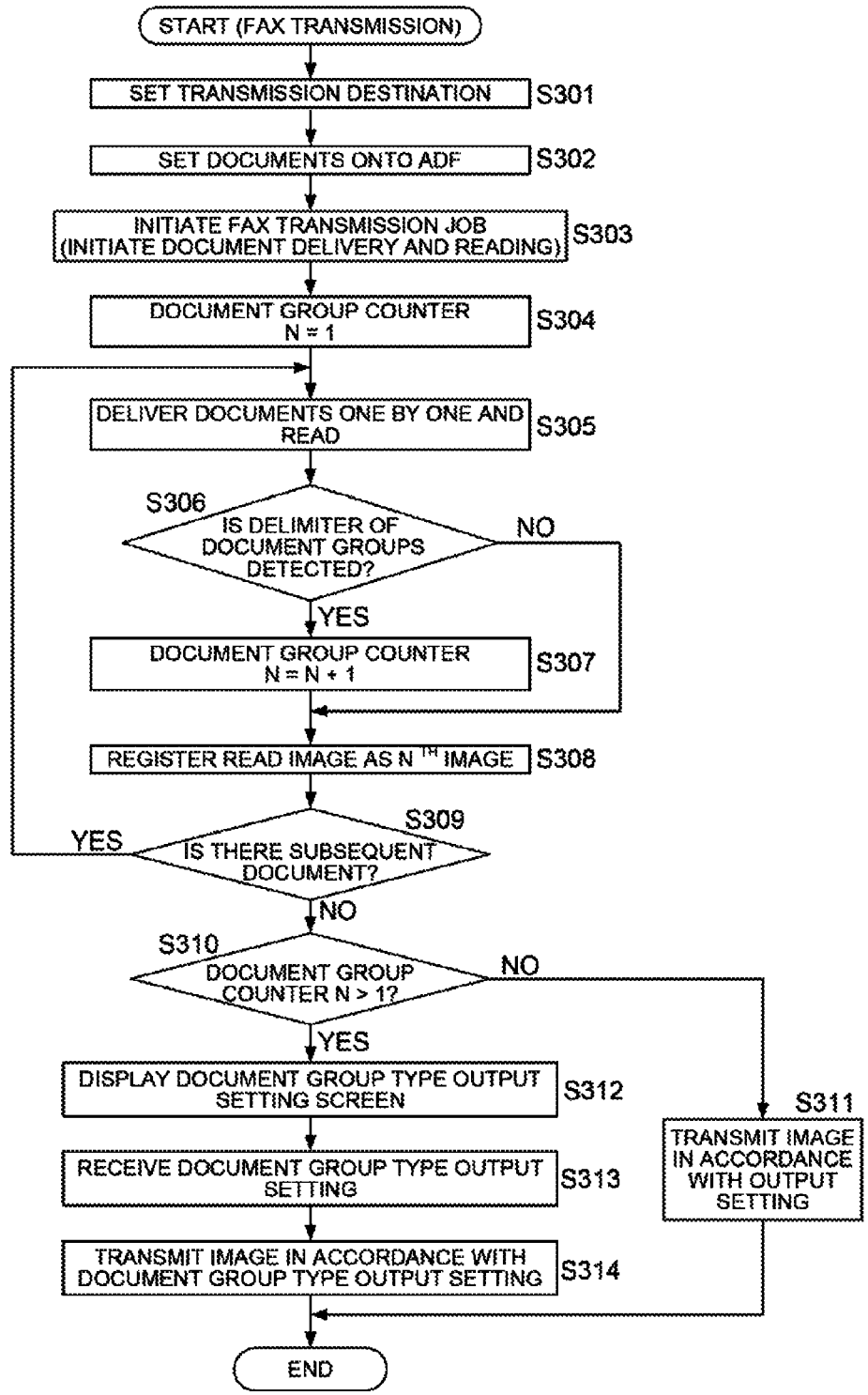
FIG. 11 is a flow chart showing an example of a facsimile transmission operation of an image processing apparatus according to a fifth embodiment of the present invention.
Figure 12:
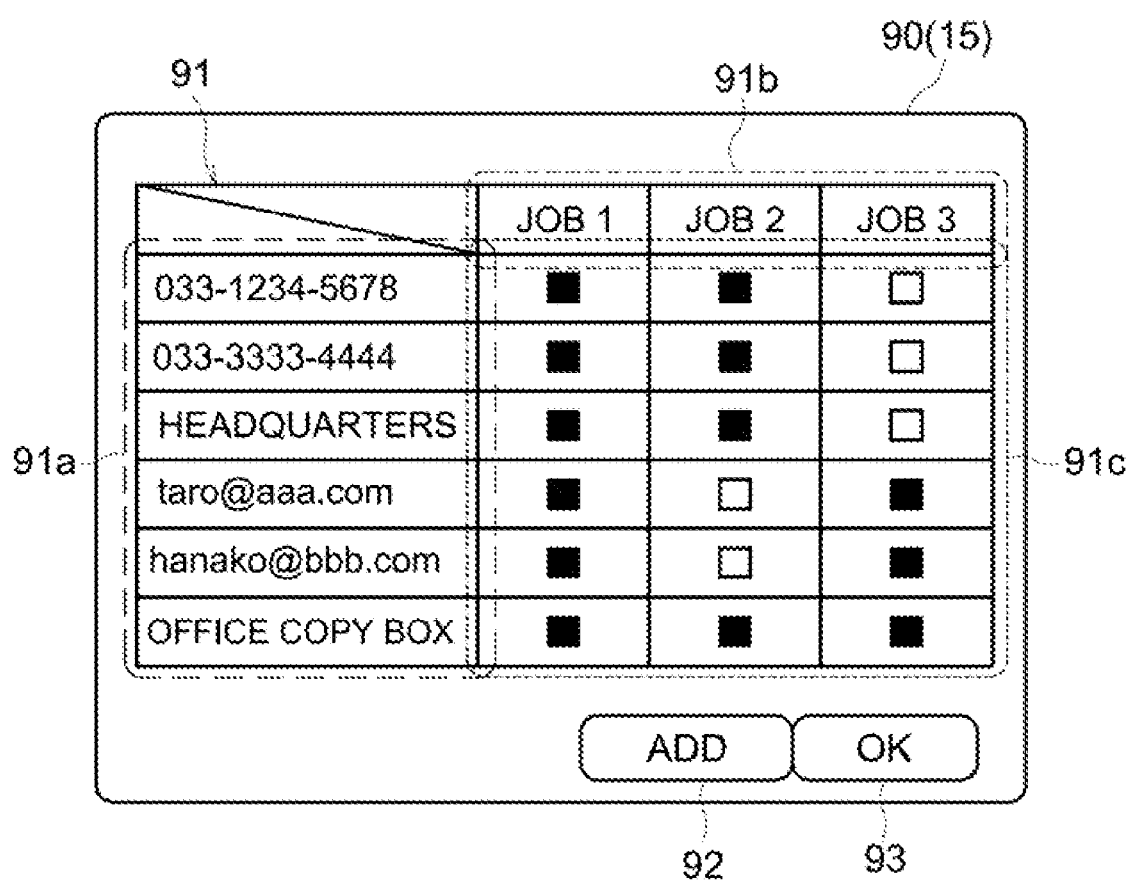
FIG. 12 is a diagram showing an example of a document group type output setting screen according to the fifth embodiment of the present invention.

FIG. 11 is a flow chart showing an example of a facsimile transmission operation of MFP 10. FIG. 12 is a diagram showing an example of document group type output setting screen 90 displayed in display section 15 in this operation. The facsimile transmission operation according to this embodiment is basically carried out in a similar flow of the copy operation of MFP 10 explained in the first embodiment. Also, the document group type output setting screen according to this fifth embodiment is also a screen to receive a setting of output conditions for each document group. Here, a case, in which a facsimile destination is used as the output conditions for which a setting is received on the basis of a document group, will be described as an example.

In cases in which documents are facsimile-transmitted via MFP 10, the user sets output conditions relating to facsimile transmission, more specifically, various setting items (parameters) relating to facsimile transmission, via the facsimile setting screen (touch panel).

When CPU 11 of MFP 10 receives a setting of output conditions (transmission destination, and the like) relating to facsimile transmission via the facsimile setting screen, CPU 11 memorizes the setting information in RAM 13 (step S301). When documents are set on automatic document feeder (ADF) 19 (step S302) and the start button is depressed by the user, CPU 11 controls to initiate facsimile transmission job (step S303).

CPU 11 sets the initial value of document group counter to 1 (N=1) (step S304). Then, CPU 11 controls automatic document feeder 19 to feed and deliver documents one by one and controls scanner section 21 to read the delivered documents (step S305). Then, CPU 11 temporarily memorizes the read image data, obtained by scanning the documents, in RAM 13.

If a separation of document groups is not detected via document group detection section 20 while documents are delivered via automatic document feeder 19 (step S306: NO), CPU 11 reads the count value of the document group counter, and links the number, which is indicated by the count value (initially, it is 1), with the image data having been stored in RAM 13, and registers the image data as the image data of the number (job number) (step S308).

If a separation of document group is detected via document group detection section 20 while documents are delivered via automatic document feeder 19 (step S306: YES), CPU 11 updates the document group counter by adding 1 (N=N+1) to the count value of the document group counter (step S307). CPU reads the updated count value of document group counter, and links the number, which is indicated by the count value, with the image data having been stored in RAM 13, and registers the image data as the image data of the number (job number) (step S308).

In cases in which there is a subsequent document, which has not yet been read, remains on automatic document feeder 19 (step S309: YES), the flow returns to step S305 and the steps onwards are repeated. In case in which there is no subsequent document remaining on automatic document feeder 19 (step S309: NO), it is determined that the reading operation of all the documents set on automatic document feeder 19 has been completed.

Then, CPU 11 checks the count value of the document group counter. If the count value of document group counter is 1 (namely, there is one document group) (step S310: NO), CPU 11 controls network communication section 18 to transmit the image data, having been sorted in RAM 13, in accordance with the setting information (setting information via facsimile setting screen) of various setting items (output conditions) having been memorized in RAM 13 (step S311/END).

In this case, MFP 10 transmits the image data of one document group, having been read, to the transmission destination which has been set via facsimile setting screen.

If the count value of document group counter is more than 1 (namely, there are plural document groups) (step S310: YES), CPU 11 controls to display a document group type output setting screen on display section 15 (step S312). The user may set output conditions (in this example, transmission destinations) on the basis of a document group via the document group type output setting screen (touch panel).

When CPU 11 receives a setting for output conditions (output setting) for each document group via the document group type output setting screen (step S313), CPU 11 memorizes the setting information in RAM 13 and erases the display of document group type output setting screen. Then, CPU 11 controls network communication section 18 to transmit the image data, having been stored in RAM 13, in accordance with the setting information of various setting items (excluding transmission destinations) relating to facsimile transmission and the setting information of transmission destination for each document group, both setting information having been memorized in RAM 13 (step S314/END).

In this case, MFP 10 transmits the image data of plural document groups, having been read, to the transmission destination for each document group, the transmission destination which has been set via the document group type output setting screen.

In the above-mentioned step S312, document group type output setting screen 90, as shown in FIG. 12, is displayed. In document group type output setting screen 90, table 91, ADD button 92 to receive an addition of output destination (transmission destination), and OK button 93 to receive completion of a setting of output conditions (existence or non-existence of output) for each document group, are displayed.

Table 91 is a table in a matrix form consisting of row elements of transmission destination and column elements of document group (JOB N), and provided with index fields of both rows and columns. In other words, table 51 is a list of the combination of transmission destinations and document groups. In index field 91*a* of a row element, transmission destinations are displayed. Examples of the transmission destinations are the telephone numbers of transmission destination, the title of transmission destination (registered title), the electronic mail address of destination via internet facsimile, and the like. In index field 91*b* of a column element, [JOB N] (N=1, 2, 3, - - - ), which is the job number representing the numbers of plural document groups, having been detected, is displayed.

In table field 91*c*, the setting information of output conditions (output conditions for each combination of document group and output destination) are displayed.

In this example, the setting information (facsimile transmission) is the setting information indicating existence or non-existence of output. In this example, [■] (output enabled), which indicates existence of output, and [□] (output disabled), which indicates non-existence of output, are displayed. In table 91, [■] is initially indicated in all the individual display areas in table field 51*c*. Those settings of existence or non-existence of output are carried out, for example, by depressing individual display area in table field 91*c*. For example, but is not limited to, when a display area in table field 91*c* is depressed, the indication of [■] or [□] shown in the display area is switched, and the setting (existence or non-existence of output) is switched according to the indication.

Also, when ADD button 92 is depressed, output destination (transmission destination) is added. When ADD button 92 is depressed, for example, a row for the newly added output destination (transmission destination) is added below the last row in table 91. When OK button 93 is depressed, the output setting, displayed in table 91, is complete.

In such a way, in facsimile transmission, similar to the copy operation, in cases in which a user desires, via MFP 10, to output the image data of documents in accordance with different output conditions (transmission destinations) for each document group by reading a plurality of document groups, the user may output the image data in accordance with different output conditions for each document group by setting a plurality of document groups onto automatic document feeder 19 and have the documents read successively one at a time, simplifying the work and operations. Similarly, also in facsimile transmission, because a plurality of document groups are automatically detected and the document group type output setting screen is automatically displayed according to the automatic detection, the operation to display the document group type output setting screen becomes redundant, resulting in a more convenient operations.

Similarly, the user may set output conditions (existence or non-existence of output) for each combination of a plurality of document groups (JOB) and a plurality of output destinations (transmission destinations) in document group type output setting screen 90 in facsimile transmission, resulting in an improved convenience. Also, by displaying the list of the combinations via table 91 in a matrix form, a similar effect of table 51 in a matrix form, explained in the first embodiment, is obtained.

Although the preferred embodiments of the present invention have been fully described by way of examples with reference to the accompanying drawings, it is to be noted that various changes and modifications will be apparent to those skilled in the art. Therefore, unless such changes and modifications depart from the scope of the present invention, they should be construed as being included therein.

As an example, pages of a plurality of document groups, set on automatic document feeder 19 of MFP 10, may not need to be continuous for each document group. In other words, pages in a document group may not have to be continuous. For example, by adding an identification information of a document group (an image information as ID information, and non-contact ID tag to which ID information is memorized, or the like) to each page, a document group my be recognized (determined) according to the identification information.

In the document group type output setting screens shown in FIGS. 6, 9, and 12, the job numbers are displayed in index fields of row elements of the table. However, like the document group type output setting screen explained in FIG. 4, a preview image of the read document may be displayed instead of the job number.

In the document group type output setting screens explained in the preferred embodiments, index fields are added to the table in a matrix form. However, those index fields may be omitted. For example, all of individual document group N (JOB N), individual output destination N, and output conditions for each combination of those, may be displayed in each table field of the table in a matrix form (N=1, 2, 3, - - - ).

More specifically, as an example: document group 1 (JOB 1), output destination 1, and the output conditions for the combination may all be displayed in the table field of the first row and first column; document group 1 (JOB 1), output destination 2, and the output conditions for the combination may all be displayed in the table field of the first row and second column; document group 2 (JOB 2), output destination 1, and the output conditions for the combination may all be displayed in the table field of the second row and first column; document group 2 (JOB 2), output destination 2, and the output conditions for the combination may all be displayed in the table field of the second row and second column.

Also, in cases in which index fields are omitted as described above, it may be configured that, for example, when a display area of table field is depressed, a detail setting screen, for setting detail output conditions (the number of copies to be outputted, application functions, and the like) for the combination of document group N (JOB N) and output destination N, displayed in the display area of table field, is displayed, and a setting of detail output conditions for the combination is received via the detail setting screen.

Further, in the document group type output setting screens explained in the preferred embodiments, although a list of combinations of a plurality of document groups and a plurality of output destinations is displayed as a table in a matrix form, display configuration is not limited to these configurations. As an example, it may be configured that, instead of the tables in a matrix form, shown in FIGS. 4 and 5, a setting screen for each document group, or a setting screen for each output destination is displayed. In this case, the user may set output conditions for individual output destination on the basis of a document group, or set output conditions for individual document group on the basis of an output destination. Also in this case, it may be configured that the user sets common output conditions for each document group, or sets common output conditions for each output destination.

Further, it may be configured that a setting of output conditions is received by using both a setting of a first output conditions on the basis of a document group, and a setting of a second output conditions on the basis of an output destination. As long as the first output conditions and the second output conditions have different output conditions, both output conditions can be applied to various output conditions. For example, in case of a copying operation, application functions, shown in application function setting screen 50 in FIG. 5, may be applied to the first and second output conditions. More specifically, for example, but is not limited to, a setting of single-side or duplex printing may be carried out on the basis of a document group, and setting of color or monochrome printing may be carried out on the basis of an output destination.

In this configuration, in cases in which, for each document group, the first output conditions (single-side/duplex printing, and the like) is to be set for a plurality of output destinations to which the document group corresponds, and, for each output destination, the second output conditions (color/monochrome printing, and the like) is to be set for a plurality of document groups to which the output destination corresponds, the operations becomes simpler when compared to cumbersome operations in which output conditions (the first an second output conditions) are set individually for each combination of a document group and an output destination.

Further, a configuration to receive a setting of output conditions on the basis of an output destination is not limited to the configuration that, in cases in which a plurality of output destinations has been set for image data to be outputted, CPU 11 is configured to receive, for each output destination, designation of a document group of which image data is to be outputted to the output destination, on the basis of an output destination, and also to receive a setting of output conditions on the basis of an output destination. As an example, the following configuration may realize the configuration to receive a setting of output conditions on the basis of an output destination.

In cases in which a plurality of output destinations has been set for image data to be outputted, CPU 11 is configured to receive the selection of one or plural output destinations on the basis of a document group, and also to receive a setting of different output conditions on the basis of an output destination.

Further, in addition to the setting of output conditions by the setting on the basis of an output destination, and by the setting on the basis of a document group, a configuration may be adopted in which output conditions (particularly, application settings) can be set by using either one of the above-mentioned two settings, or a setting on the basis of a combination of a document group and an output destination. As just described, in cases in which a plurality of settings on a plurality of different basis are combined, it is assumed that there is a possibility in which a different output condition is set to the same setting item, or a setting of contradictory output conditions is carried out. To cope with this possibility, it is preferred to set a priority for settings. As an example, the order of priority may be set such that "the setting on the basis of a combination of a document group and an output destination">"the setting on the basis of a document group">"the setting on the basis of an output destination", or the like.

Also, output conditions (particularly, application settings) which have been set at the initiation of document reading, may be set as the default, and for the default, partial modification of settings may be received on the basis of an output destination, a document group, a combination of an output destination and a document group, or the like.

Further, in addition that the setting screen (document group type output setting screen) is displayed in cases in which a plurality of document groups has been detected, the setting screen may be configured to be displayed under conditions that a plurality of document groups has been detected and also a plurality of output destinations has been set, in addition that the setting screen is displayed in cases in which a plurality of document groups has been detected.

The image processing apparatus according to the present invention need not be restricted to a multi-function peripheral explained in the preferred embodiment, but this invention can be applied to an image processing apparatus such as copying machines, facsimile machines, and various other types of image processing apparatuses.

What is claimed is:

1. An image processing apparatus comprising:
   a reading section configured to obtain image data by scanning a document;
   a document feeding section configured to deliver a plurality of pages of documents successively to said reading section;
   a detection section configured to detect a document group from the plurality of pages of documents successively delivered by said document feeding section;
   a memory section configured to memorize the image data obtained by said reading section;
   an output section configured to output the image data, having been memorized by said memory section, in accordance with an output condition having been set;
   a display section;
   an operation section via which an operator sets an output condition for the output section; and
   a control section that is configured to receive a setting of the output condition set by the operator,
   wherein said control section is configured so as to: (a) receive the setting of an output condition via said operation section before the document feeding section starts delivering the plurality of pages of documents; (b) display a setting screen on said display section for setting an output condition on the basis of a document group, in a case in which a plurality of document groups has been detected for the image data which have been memorized by said memory section; and (c) receive a setting of an output condition, after the plurality of document groups has been detected, via said operation section on the basis of each document group of the plurality of document groups.

2. The image processing apparatus of claim 1, wherein said output section comprises an image transmission section that transmits image data to an external device, and said output condition comprises a transmission destination of image data to be transmitted from said image transmission section.

3. The image processing apparatus of claim 1, wherein, in a case in which a plurality of output destinations has been set for image data to be outputted by said output section, said control section is configured so as to receive an output condition in accordance with a combination of the plurality of document groups, having been detected by said detection section, and said plurality of output destinations, having been set.

4. The image processing apparatus of claim 3, wherein said control section is configured so as to: (a) display, on said setting screen, a table in a matrix form, wherein either one of a document group or an output destination is set as an element of a row and the other is set as an element of a column, and also; (b) receive a designation of a combination of a document group and an output destination via a selection operation of the elements of a row and a column in said table.

5. The image processing apparatus of claim 3, wherein said control section is configured so as to receive said setting of a plurality of output destinations via said operation section prior to initiation of reading of a document via said reading section.

6. The image processing apparatus of claim 3, wherein said control section is configured so as to receive said setting of a plurality of output destinations via said operation section after completion of document reading via said reading section.

7. The image processing apparatus of claim 1, wherein, in a case in which a plurality of output destinations has been set for image data to be outputted by said output section, said control section is configured so as to: (a) receive, for each output destination, a designation of a document group, of which image data is to be outputted to the output destination, on the basis of an output destination; and also (b) receive a setting of an output condition on the basis of an output destination.

8. The image processing apparatus of claim 7, wherein said control section is configured so as to: (a) display, on said setting screen, a table in a matrix form, wherein either one of a document group or an output destination is set as an element of a row and the other is set as an element of a column and wherein an index field is provided for each of the elements of a row and the elements of a column; (b) receive said designation via a selection operation of the elements of a row and a column in said table; and (c) receive a selection of an output destination, for which said setting of an output condition on the basis of an output destination is to be received, via a selection operation of the index field for output destination in said table.

9. The image processing apparatus of claim 7, wherein said control section is configured so as to receive said setting of a plurality of output destinations via said operation section after completion of document reading via said reading section.

10. The image processing apparatus of claim 7, wherein said control section is configured so as to receive said setting of a plurality of output destinations via said operation section prior to initiation of reading of a document via said reading section.

11. The image processing apparatus of claim 1, wherein, in a case in which a plurality of output destinations has been set for image data to be outputted by said output section, said control section is configured so as to receive a setting of an output condition by using a setting of a first output condition on the basis of a document group, in combination with a setting of a second output condition on the basis of an output destination.

12. The image processing apparatus of claim 1, wherein said detection section is configured so as to detect a document group while a plurality of pages of documents is being delivered successively via said document feeding section, wherein said control section is configured, in a case in which two document groups have been detected while a plurality of pages of documents has been delivered successively via said document feeding section, so as to display the two document groups on said setting screen, and each time when a new document group is detected, said control section is configured so as to display the new document group additionally on said setting screen.

13. The image processing apparatus of claim 1, wherein said output section comprises an image forming section that forms and outputs an image based on image data onto a recording medium, and said output condition comprises a number of copies to be outputted by said image forming section.

14. An image processing apparatus comprising:
a reading section configured to obtain image data by scanning a document;
a document feeding section configured to deliver a plurality of pages of documents successively to said reading section;
a detection section configured to detect a document group from the plurality of pages of documents successively delivered by said document feeding section;
a memory section configured to memorize the image data obtained by said reading section;
an output section configured to output the image data, having been memorized by said memory section, in accordance with an output condition having been set;
a display section;
an operation section via which an operator sets an output condition for the output section; and
a control section that is configured to receive a setting of the output condition set by the operator,
wherein said control section is configured so as to: (a) receive the setting of an output condition via said operation section before the document feeding section starts delivering the plurality of pages of documents; (b) display a setting screen on said display section for setting an output condition on the basis of a document group, in a case in which a plurality of document groups has been detected for the image data which have been memorized by said memory section; and (c) receive a setting of an output condition, after the plurality of document groups has been detected, via said operation section on the basis of each document group of the plurality of document groups
wherein, in a case in which a plurality of output destinations has been set for image data to be outputted by said output section, said control section is configured so as to receive a setting of an output condition by using a setting of a first output condition on the basis of a document group, in combination with a setting of a second output condition on the basis of an output destination.

15. An image processing apparatus comprising:
a reading section configured to obtain image data by scanning a document;
a document feeding section configured to deliver a plurality of pages of documents successively to said reading section;
a detection section configured to detect a document group from the plurality of pages of documents successively delivered by said document feeding section;
a memory section configured to memorize the image data obtained by said reading section;
an output section configured to output the image data, having been memorized by said memory section, in accordance with an output condition having been set;
a display section;
an operation section via which an operator sets an output condition for the output section; and
a control section that is configured to receive a setting of the output condition set by the operator,
wherein said control section is configured so as to: (a) receive the setting of an output condition via said operation section before the document feeding section starts delivering the plurality of pages of documents; (b) display a setting screen on said display section for setting an output condition on the basis of a document group, in a case in which a plurality of document groups has been detected for the image data which have been memorized by said memory section; and (c) receive a setting of an output condition, after the plurality of document groups has been detected, via said operation section on the basis of each document group of the plurality of document groups
wherein, in a case in which a plurality of output destinations has been set for image data to be outputted by said output section, said control section is configured so as to: (a) receive, for each output destination, a designation of a document group, of which image data is to be outputted to the output destination, on the basis of an output destination; and also (b) receive a setting of an output condition on the basis of an output destination.

* * * * *